US008768773B2

(12) United States Patent
McMaster et al.

(10) Patent No.: US 8,768,773 B2
(45) Date of Patent: Jul. 1, 2014

(54) INTERACTIVE SYSTEM FOR PROVIDING AN INDIVIDUAL WITH CONTROL OF THE COLLECTION/DISTRIBUTION AND CONTENT MANAGEMENT OF TRANSACTION AND ACTIVITIES DATA

(76) Inventors: Orlando McMaster, Weston, FL (US); Eustace Prince Isidore, Austin, TX (US)

( * ) Notice: Subject to any disclaimer, the term of this patent is extended or adjusted under 35 U.S.C. 154(b) by 0 days.

(21) Appl. No.: 12/954,612

(22) Filed: Nov. 24, 2010

(65) Prior Publication Data

US 2013/0268369 A1 Oct. 10, 2013

Related U.S. Application Data

(60) Provisional application No. 61/264,242, filed on Nov. 24, 2009.

(51) Int. Cl.
*G06Q 30/00* (2012.01)
(52) U.S. Cl.
USPC ............................. 705/14.66; 705/14.41
(58) Field of Classification Search
CPC .................................................. G06Q 30/02
USPC ............................................ 705/14.41, 14.66
See application file for complete search history.

(56) References Cited

U.S. PATENT DOCUMENTS

| | | | |
|---|---|---|---|
| 2007/0033133 A1* | 2/2007 | Pishevar et al. | 705/37 |
| 2010/0042471 A1* | 2/2010 | Chang et al. | 705/10 |
| 2010/0332330 A1* | 12/2010 | Goel et al. | 705/14.66 |

* cited by examiner

*Primary Examiner* — Sun Li
(74) *Attorney, Agent, or Firm* — Isidore PLLC (57) ABSTRACT

A method, a system and a computer program product for providing an individual with management/distribution control of the individual's personal information and transaction information. A transaction data management (TDM) utility executes on a data processing system and receives transaction reports from internal/external applications based on member permissions. Based on user configuration/request, the TDM utility records/displays the transaction information as a public announcement and/or a private record within a dynamic transaction/activity information profile. The TDM utility enables the individual to provide supplemental information describing transactions for which reports are received. In addition, the TDM utility enables the individual to provide a schedule of previous/future transactions. The TDM utility rates the individual according to the quality of transactions and the reliability of the transaction schedule . . . The TDM utility categorizes activities outlined in the transaction reports/schedules. The TDM utility serves targeted advertisements to the individual and/or performs transactions involving the individual's information, based on permissions and compensation agreements.

10 Claims, 8 Drawing Sheets

300 Schedule of Future Purchases by John James

| Item ID (304) | Item (306) | Scheduled Date of Purchase (308) | Preference: Brand/Model (309) | Preference: Price (310) | Potential purchase triggered (312) |
|---|---|---|---|---|---|
| 23 | Laptop PC | 12/15/09 | HP Pavilion dv6000 | Less than $600.00 | Windows 7 OS |
| 3 | Operating System | 1/15/10 | Windows 7 OS | Less than $400.00 | |
| 45 | 1 way Airline ticket: Tampa to Las Vegas | 1/17/10 | | Less than $80.00 | Hotel stay in Las Vegas |

303 → (row 23)
316 → (row 3)
320 → (row 45)

FIG. 3

Social Network 400

*Home page of John James*

*Recent activities of John James*

On date 1:

404 → At timestamp1, John purchases Kenneth Cole model 7 shoes

406 → At timestamp2, John purchases tickets for U2 concert

Date of birth: date1

Home: city1

Status: single

Profession: banker

Contact john james

View John's friends

INTERACTIVE SYSTEM FOR PROVIDING AN INDIVIDUAL WITH CONTROL OF THE COLLECTION/DISTRIBUTION AND CONTENT MANAGEMENT OF TRANSACTION AND ACTIVITIES DATA

BACKGROUND

1. Technical Field

The present invention generally relates to information/data management systems and in particular to individual/user controlled information/data management systems and social media applications.

2. Description of the Related Art

With millions of users/members, social networking websites have become an increasingly popular tool for advertising products and services. Social networking sites primarily generate revenue by enabling businesses to advertise their products to members based on demographics and/or interests. In some cases, these social networking sites observe the actions of members on particular websites to categorize the members. As a result, targeted advertisements may be served according to these actions.

Social networking sites are expected to obtain a member's permission before providing a member's information to a third party, according to a published privacy policy. However, social networking website members are given little incentive to grant permissions to social networking sites to provide third parties with respective members' contact/transaction information.

BRIEF SUMMARY

Disclosed are a method, a system and a computer program product for providing an individual with management/distribution control of the individual's personal information and transaction information. A transaction data management (TDM) utility executes on a data processing system and receives authorized transaction reports from internal and/or external applications based on pre-set or pre-established member permissions. Based on user configuration/request, the TDM utility records/displays the transaction information as a public announcement and/or as a private record within a dynamic transaction/activity information profile. The TDM utility enables the individual to provide supplemental information describing transactions for which reports are received. In addition, the TDM utility enables the individual to provide a schedule of previous/future transactions conducted or to be conducted by the individual. The TDM utility rates the individual according to the quality of transactions and the reliability of the transaction schedule to actual completion of the individual's scheduled transactions. The TDM utility categorizes activities outlined in the transaction reports/schedules. The TDM utility serves targeted advertisements to the individual and/or performs transactions involving the individual's information, based on permissions and compensation agreements.

The TDM utility also enables an individual to efficiently locate and assemble valuable customers for a particular business based on activities data and/or a transaction schedule. The TDM utility enables the individual to maintain a valuable customer base by adding new customers as the activities data and/or transaction schedule of members on a corresponding social network are modified. The TDM utility enables the individual to also employ other individuals and to create online/virtual companies comprising valuable employees and customers, according to a rating system. The TDM utility allows a customer to establish different networks and/or network memberships for friends/affiliates with different interests/experiences. For example, business entities may be given limited access to the individual in order to serve the individual a preset number of advertisements. In addition, the TDM utility alerts the individual when a friendly/authorized advertisement is being received by the individual. The TDM utility provides the individual with tracking information, which indicates the links between transaction report/data, authorized sale/distribution of data and received advertisements.

The TDM utility enables individuals to efficiently locate vendors that match the individuals' buying interests. The TDM utility allows individuals to collaborate with other members to perform group transactions. For example, the TDM utility facilitates group transactions by initiating a simultaneous group payment procedure.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, a system and a computer program product for providing an individual with management/distribution control of the individual's personal information and transaction information. A transaction data management (TDM) utility executes on a data processing system and receives transaction reports from internal/external applications based on member permissions. Based on user configuration/request, the TDM utility records/displays the transaction information as a public announcement and/or a private record within a dynamic transaction/activity information profile. The TDM utility enables the individual to provide supplemental information describing transactions for which reports are received. In addition, the TDM utility enables the individual to provide a schedule of previous/future transactions. The TDM utility rates the individual according to the quality of transactions and the reliability of the transaction schedule. The TDM utility categorizes activities outlined in the transaction reports/schedules. The TDM utility serves targeted advertisements to the individual and/or performs transactions involving the individual's information, based on permissions and compensation agreements.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term "crash" refers to a significant and targeted reduction in the price of a product/service.

Figure 1:
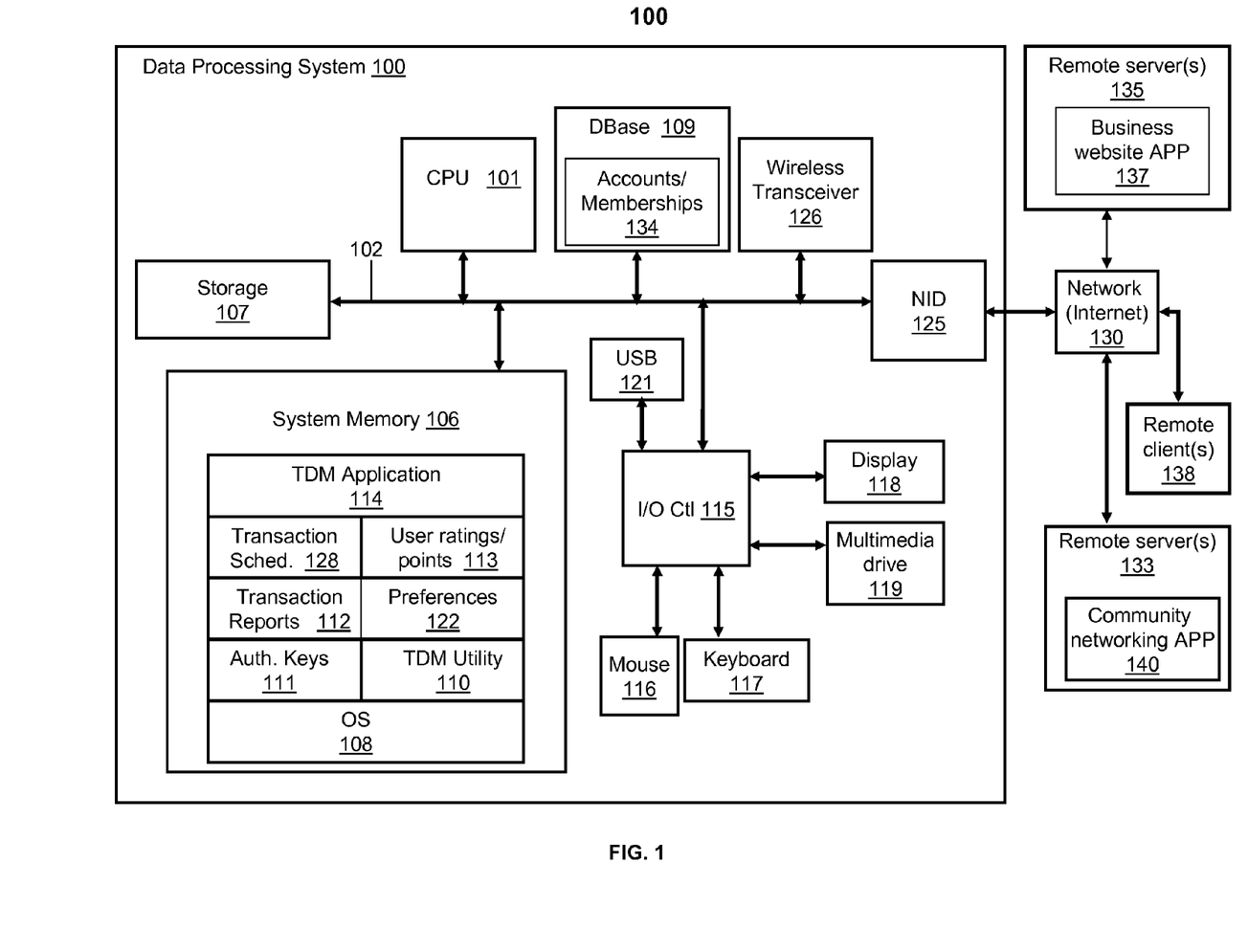
FIG. 1 provides a block diagram representation of an example data processing system within which certain features of the invention may be practiced, according to one embodiment.

With reference now to the figures, and beginning with FIG. 1, there is depicted a block diagram representation of an example data processing system (DPS), as utilized within one embodiment. DPS may be a server, a personal computer, a portable device, such as a personal digital assistant (PDA), a smart phone, and/or other types of electronic devices that may generally be considered processing devices. As illustrated, DPS 100 comprises at least one processor or central processing unit (CPU) 101 connected to system memory 106 via system interconnect/bus 102. Also connected to system bus 102 is input/output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved. DPS 100 also comprises storage 107, within/from which data/instructions/code may also be stored/retrieved. Database 109 is also connected to system bus 102 of DPS 100, within/from which business intelligence data and patrons' account information may also be stored/retrieved.

DPS 100 is also illustrated with wireless transceiver 126, which may receive and transmit signals from/to display monitors and receivers located in an environment that is within a wireless range of wireless transceiver 126. To further enable external network connection, DPS 100 also includes network interface component (NIC) 125, by which DPS 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. NIC 125 may be configured to operate via wired or wireless connection to an access point of the network. Network 130 may be an external network such as the Internet or wide area network (WAN), or an internal network such as an Ethernet (local area network—LAN) or a Virtual Private Network (VPN). Connection to the external network 130 may be established with one or more servers 133, which may also provide data/instructions/code for execution on DPS 100, in one embodiment. In one embodiment, social/community networking site 140 is illustrated within server 133. DPS 100 may also connect to one or more remote clients 135 via network 130.

In addition to the above described hardware components of wireless system 100, various features of the invention are completed/supported via software (or firmware) code or logic stored within memory 106 or other storage and executed by Processor 101. Thus, for example, illustrated within memory 106 are a number of software/firmware/logic components, including transaction reports 112, transaction data management (TDM) application 114, transaction schedule 128, user/individual ratings 113 and preferences 122. In one embodiment, sub-network membership/subscription data 134 are stored in DBase 109. In addition, memory 106 comprises authorization keys 111 and Transaction Data Management (TDM) logic/utility 110. In actual implementation, TDM logic 110 may be combined with application 114 to provide a single executable component, collectively providing the various functions of each individual component when the corresponding combined component is activated. For simplicity, TDM logic/utility 110 is illustrated and described as a stand alone or separate logic/firmware component, which provides specific functions, as described below.

In one embodiment, server 133 represents a software deploying server, and DPS 100 communicates with the software deploying server (133) via network (e.g., Internet 130) using network interface device 125. Then, TDM utility 110 may be deployed from/on the network, via software deploying server 133. With this configuration, software deploying server performs all of the functions associated with the execution of TDM utility 110. Accordingly, DPS 100 is not required to utilize internal computing resources of DPS 100 to execute TDM utility 110.

TDM utility 110 is an intelligent activity recognition and transaction and activities profile development system. TDM utility 110 is a learning system which is able to find/investigate associations/connections between data from various collection mechanisms. TDM utility 110 is configured to enable the individual to accept or reject specific findings.

Certain of the functions supported and/or provided by TDM utility/logic 110 are implemented as processing logic (or code) executed by processor 101 and/or other device hardware, which processing logic enables the device to implement/perform those function(s). Among the software code/instructions/logic provided by TDM logic 110, and which are specific to the invention, are: (a) logic for intelligently compiling transaction information; (b) logic for providing an individual with (i) management of transaction information, (ii) control of transaction data distribution and (iii) control of businesses' advertising access to the individual; (c) logic for providing targeted advertising based on utilizing the transaction information and individual permissions; (d) logic for rating individuals/data based on the quality and reliability of transaction information; (e) logic for enabling an individual or group to create one or more distinct sub-networks; and (f) logic for enabling individuals or groups to create online/virtual companies to promote/sell items, to selectively/strategically acquire employees and customers. According to the illustrative embodiment, when Processor 101 executes TDM logic 110, DPS 100 initiates a series of functional processes that enable the above functional features as well as additional features/functionality. These features/functionalities are described in greater detail below within the description of FIGS. 2-8.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

Figure 2:
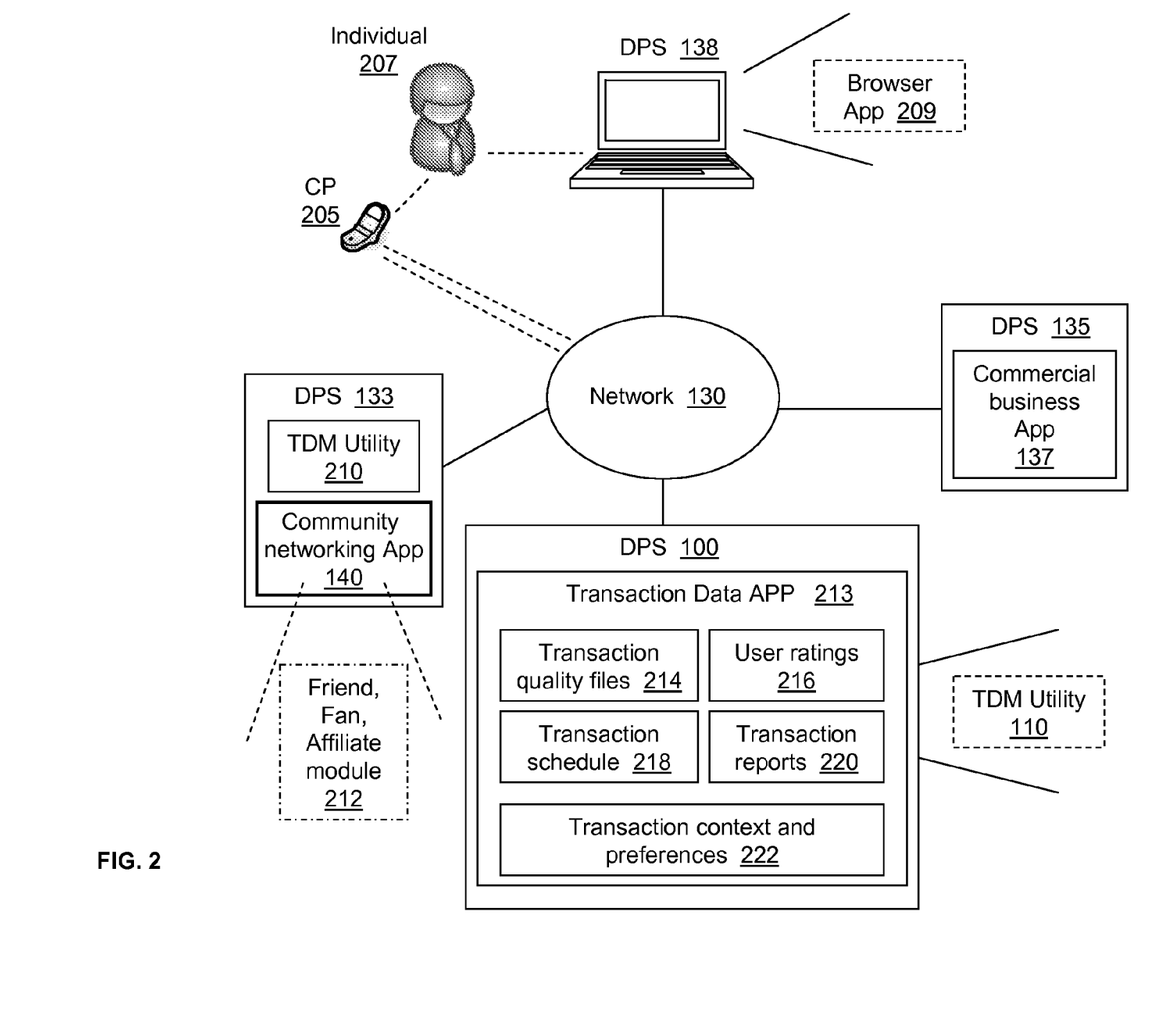
FIG. 2 illustrates an example network of application servers collectively comprising a community networking application, a transaction data application and a commercial business application, according to one embodiment.

With reference now to FIG. 2, an example network of application servers that include a community networking application, a transaction data application and a commercial business application is illustrated, according to one embodiment. Network 200 comprises first server 100, second server 133 and third server 135. In addition, Network 200 comprises DPS 138 and cellular telephone 205. First server 100 comprises transaction/activities data application 213 which further comprises transaction quality information 214, consumer/member ratings 216, transaction schedule 218, transaction reports 220 and transaction context and preferences/supplemental information 222. Second server 133 includes community networking application/engine 140 and TDM utility 210. Community networking application/engine 140 includes a corresponding community networking website and friend/fan/affiliate module 212. Third server 135 comprises commercial business application 137. In one embodiment, first server 100 and second server 133 are separate/independent entities. In another embodiment, first server 100 and second server 133 are integrated within a single server. Furthermore, the illustrated components of DPS 100 and DPS 133 may be integrated within community networking application 140. In one embodiment, TDM utility 110 and TDM utility 210 are separate components which collectively comprise the functions of the TDM utility. In another embodiment, TDM utility 110 and TDM utility 210 may be combined with application 114 to provide a single executable component that represents the functions of the TDM utility. As described herein, TDM utility 110 includes the collective functions of the TDM utility.

In Network 200, TDM utility 110 enables individual 207 to utilize browser application 209 on DPS 138 to access a corresponding member account provided by community networking application 140. In addition, individual 207/cell 205 has the option of accessing the member account by using cellular telephone 205 to access the member account within community networking application 140. Individual 205 accesses third server via Network 130 to purchase items via transactions on commercial business application 137. Server 135 generates a transaction report which is sent to DPS 100 and community networking application 140 on DPS 133. In one embodiment, individual 207 uses a wireless device 205 which is integrated with an electronic credit/financial instrument that allows the user to pay for products and/or services. The electronic credit/financial instrument is linked to a financial account for individual 207. Individual 207 secures an arrangement with the financial company that provides the financial instrument to allow individual 207/TDM utility 110 to receive authenticated transaction reports in the user/member account in transaction data application 213. In another embodiment, the transaction report is sent directly by the vendor that sells products and/or services to individual 207, according to authorization/request by individual 207.

At second server 133, TDM utility 110/210 receives a transaction/activity report from an internal application (i.e., an application on the same platform as community networking application 140) or external commercial application (e.g., commercial business application 137). In one embodiment, TDM utility 110 links the transaction/activity report to a transaction and activities profile/account 134 of individual 207.

In one embodiment, TDM utility 110 enables the individual to authorize other/external systems/organizations with various data collection mechanisms/technology to collect activities data on behalf of the individual as the individual performs various types of activities, including activities while the individual is offline as well as the individual's activities on different websites. Thus, TDM utility 110 consolidates/compiles collected activities data from various sources.

TDM utility 110 categorizes the transaction activity into one or more categories. TDM utility 110 enables a member to provide supplemental/context information corresponding to transaction reports via structured and/or unstructured data input. In addition, TDM utility 110 receives transaction schedule information from the member. The member provides transaction schedule information to indicate one or more of: (a) authenticated past transactions; (b) past transactions which may be subsequently authenticated; and (c) future transactions. TDM utility 110 receives preferences for future purchase items (i.e., items that a particular member expects to purchase in the future) from the member that provides the transaction schedule. TDM utility 110 allows members/users to provide causal activity information pertaining to next/future purchase items. TDM utility 110 also categorizes causal activity information and information provided within the transaction schedule. TDM utility 110 receives from the member further information regarding the interests of the member. In addition, TDM utility 110 automatically generates further causal data from intelligent analysis of transaction data/trends. TDM utility 110 allows the user/member to accept or reject the generated causal data. TDM utility 110 rates users/members and user data. TDM utility 110 updates the categories corresponding to the member according to the data received/provided and generated. In one embodiment, TDM utility 110 rates the member according to the financial weight of the transaction, the transaction schedule and the reliability of the (past and pre-announced) transaction schedule.

In one embodiment, TDM utility 110 determines the reliability of the transaction schedule based on the degree to which the transactions forecasted/indicated in the schedule are executed on schedule. When TDM utility 110 receives a transaction report, TDM utility 110 compares information on the transaction report with information provided in the transaction schedule to determine whether the report provides information that matches an activity/transaction forecasted/indicated on the transaction schedule. TDM utility 110 adjusts the user rating in response to the report providing information that matches an activity/transaction forecasted/indicated on the transaction schedule. TDM utility 110 rates the user according to how closely the forecasted information from the schedule matches the information from the transaction report. TDM utility 110 also considers/factors cancelled transactions by the user in providing a user rating. In addition to the user rating, TDM utility 110 may provide points based on the level of purchases and/or based on the consumer/member rating of individual 207. In one embodiment, individual 207 obtains points/credits when other members of TDM application 114/213 access links (associated with reported activities of individual 207) and makes purchases. TDM utility 110 may provide a cash value for points which points may be redeemed for cash/payment once a particular threshold point value is attained.

In one embodiment, TDM utility 110 evaluates the user data according to the member rating, interests and the future transaction schedule. TDM utility 110 enables individuals, groups, online/virtual companies, and external companies to search for a target advertising pool of individuals based on categories pertaining to transaction information, user interests, causal/trigger data, etc. TDM utility 110 allows business entities to request/receive notification of the execution of trigger transactions to inform the business entities of a transaction which is likely to precede a transaction of interest. When the trigger transaction occurs, TDM utility 110 notifies the business/organization of the execution of the trigger transaction. TDM utility 110 receives from the business entity a data request to access member data or communicate with the member based on the corresponding trigger transaction and/or the search criteria.

TDM utility 110 provides access to relevant target member (s) based on operating policies and member permissions. TDM utility 110 may enable the business entity to begin advertising or increase the intensity of advertising to the members/individuals/group involved in the trigger transaction. TDM utility 110 enables an individual to receive advertisement tracking information. TDM utility 110 tracks the provision granted to an organization and/or business entity to receive advertising access to the individual and maps advertising content to specific authorization by the individual.

When TDM utility 110 detects receipt of a transaction record, TDM utility 110 determines whether a scheduled transaction occurs (i.e., a scheduled transaction matches information in the transaction schedule) and/or demonstration of an interest occurs. TDM utility 110 updates user ratings based on quality of transactions and/or (the level of) fulfillment of forecasted transactions.

TDM utility 110 and the data collection components represent a significant evolutionary step in the capabilities for collecting data pertaining to virtually all aspects of an individual's life. TDM utility 110 and associated functions provide the infrastructure for a paradigm shift, which is based upon individuals managing/owning their activities data, actively seeking to track (i.e., collect data and create transaction reports pertaining to) their activities across the various dimensional presences, and controlling the distribution of the activities/transaction data and ultimately the type of advertising content received (including control of the medium (i.e., selected online applications, television or print media) and time/schedule for receiving advertising content).

Figure 3:
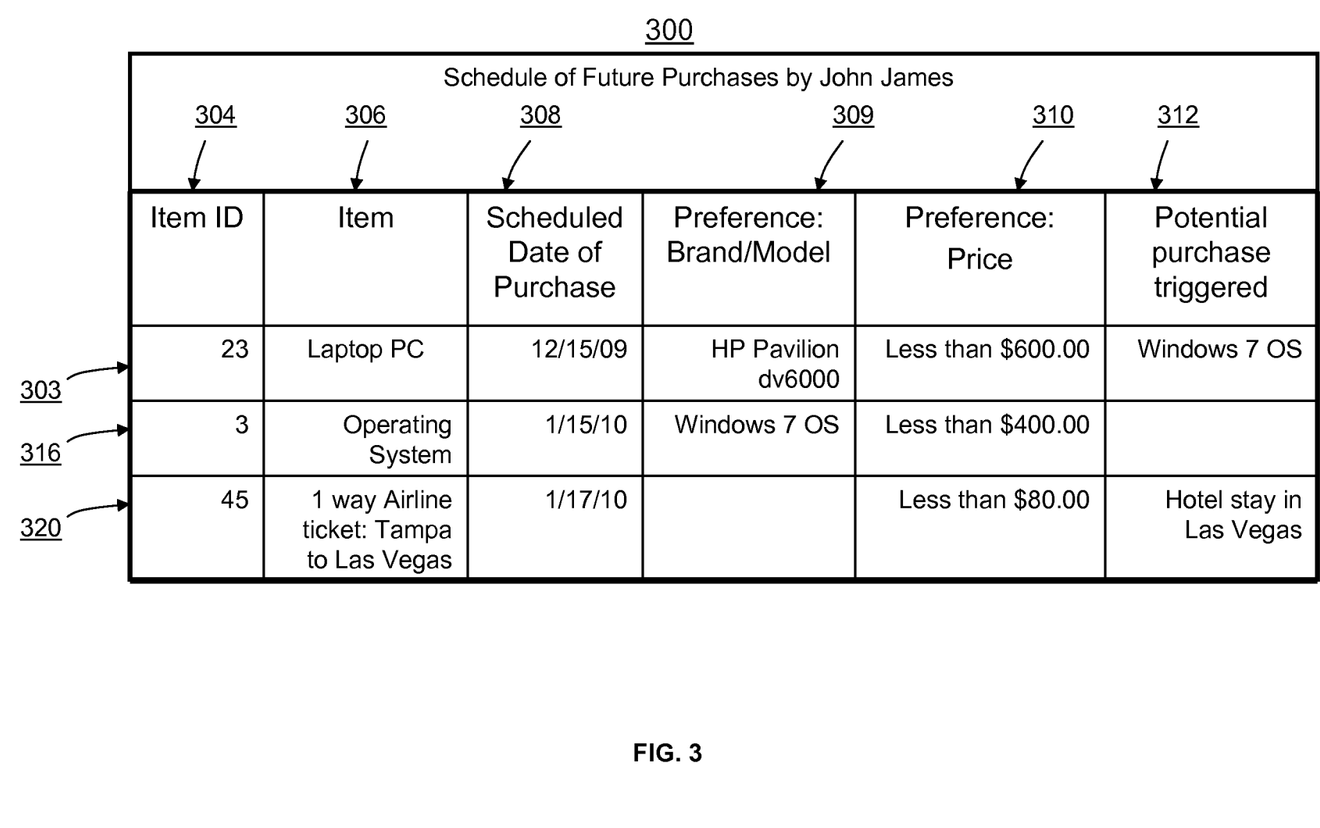
FIG. 3 illustrates an example table showing a schedule of future transactions and in particular a schedule of future purchases, according to one embodiment.

FIG. 3 illustrates an example table showing a schedule of future transactions and in particular a schedule of future purchases, according to one embodiment. Table 300 shows transaction data for three items within three table rows. The data for each item is divided among six columns within table 300. In particular, table 300 comprises first row 303, second row 316 and third row 320. Table 300 also comprises "item ID" column 304, name of "item" column 306, "scheduled date of purchase" column 308, "Preference: Brand/Model" column 309, "Preference: Price" column 310 and "Potential purchase triggered" column 312.

According to first row item 302, John James indicates an intention to purchase a Laptop PC on (approximately) Dec. 15, 2009. John indicates a brand/model preference for an "HP Pavilion dv 6000" laptop. In addition, John indicates a price preference of less than $600.00 as indicated by "Preference: Price" column 310 of first row item 303. John indicates that the purchase of the laptop PC is likely to trigger the purchase of a Windows 7 operating System (OS), as indicated by "potential purchase triggered" column 312 of first row item 303.

Figure 4:
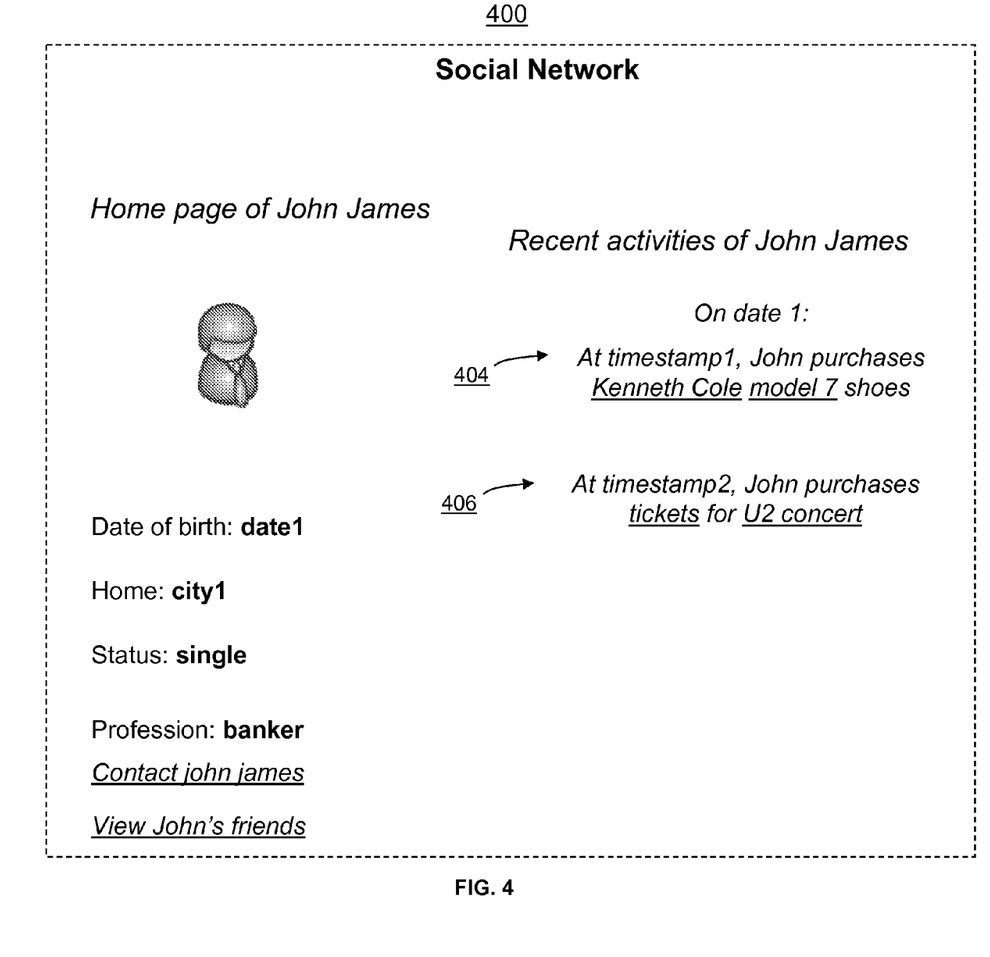
FIG. 4 illustrates an example display of a member homepage on a social network website, according to one embodiment.

Shifting focus now to another aspect of the disclosed embodiments, FIG. 4 illustrates an example display of a member homepage on a social network website, according to one embodiment. Member homepage 400 comprises first activity log/track 404 and second activity log/track 406.

When a particular transaction/event occurs, a report is sent to one or more of: (a) a homepage; (b) an announcement page; and (c) an activities page of a corresponding member on a social networking website/online application. TDM utility 110 automatically triggers creation (or creating) of a record of the event within a specified page of an online application for a particular member or group of members involved in the event. When one or more members of the group of members that are involved in a transaction are involved in a same transaction, TDM utility 110 triggers a friend request between the members who do not have an online friendship on the social networking website. In one embodiment, TDM utility 110 on a first platform communicates with TDM utility 210 on a second/external platform (upon which TDM application 114 resides) to determine whether an online friendship exists on the second platform between two members who are involved in the same/shared activity/transaction that occurs on and/or is detected via the first platform. TDM utility 110 may also provide a link to pages of the vendor involved in the transaction.

TDM utility 110 publishes a report which indicates that "at timestamp1, John James purchases Kenneth Cole model 7 shoes" and "at timestamp2, John James purchases tickets for U2 concert", according to first activity log/track 404 and second activity log/track 406, respectively.

TDM utility 110 utilizes a number of hypertext links to represent certain key words within member homepage 400. For example, according to first activity log/track 404, hypertext links are used to represent the following words/phrases: (a) Kenneth Cole; and (b) model 7. When these hypertext links are accessed, TDM utility 110 enables a website visitor to view the appropriate website pages of the business/vendor.

FIGS. 5-8 are flow charts illustrating various methods by which the above process of the illustrative embodiments is completed. Although the methods illustrated in FIGS. 5-8 may be described with reference to components shown in FIGS. 1-4, it should be understood that this is merely for convenience and alternative components and/or configurations thereof can be employed when implementing the various methods. Key portions of the methods may be completed by TDM utility 110 executing on processor 101 within DPS 100 (FIG. 1) and controlling specific operations of/on DPS 100, and the methods are thus described from the perspective of either/both TDM utility 110 and DPS 100 or other device that provides the functionality associated with one or more versions of TDM utility 110.

Figure 5:
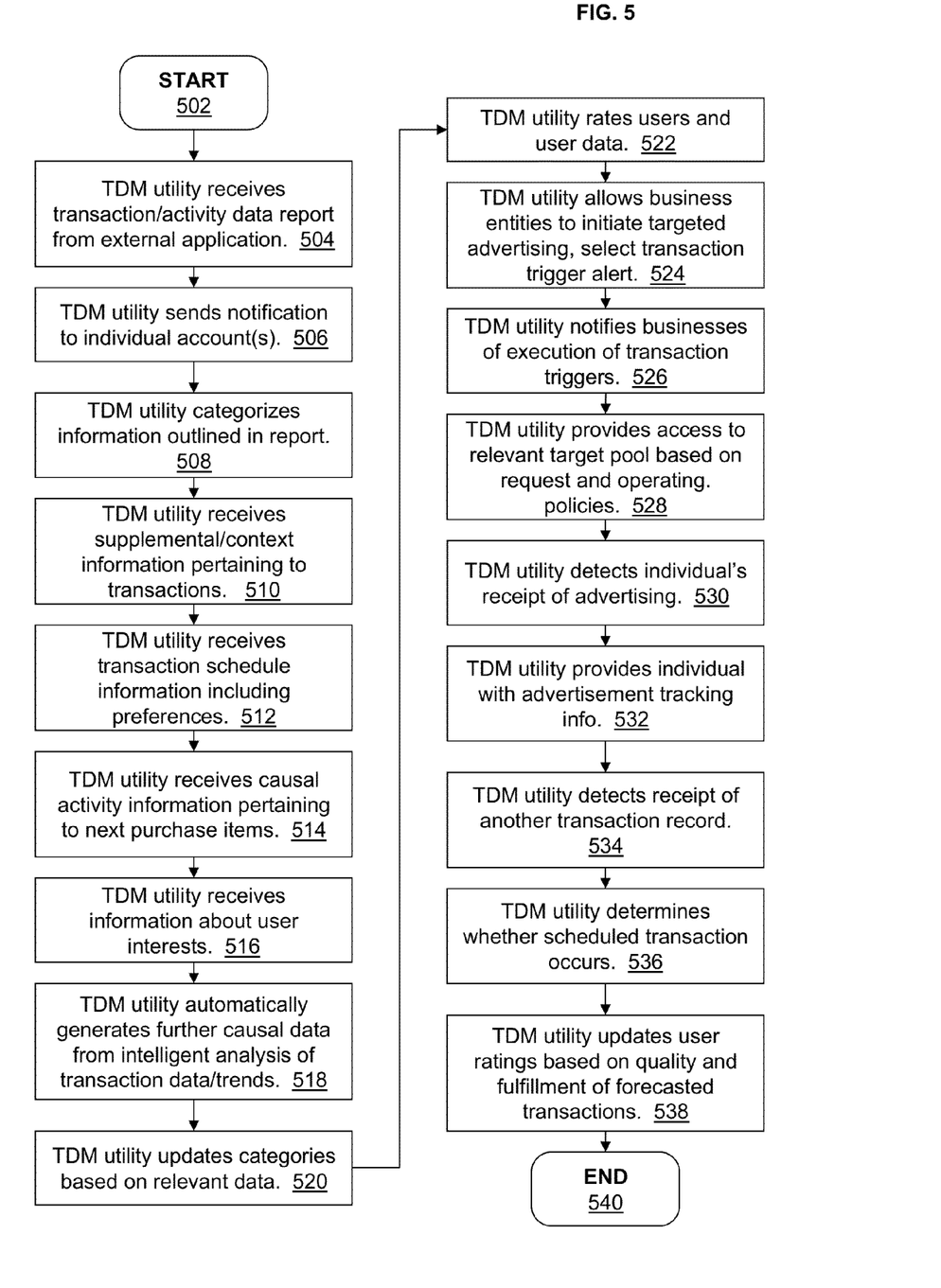
FIG. 5 is a flow chart illustrating the process of intelligently compiling transaction information, providing targeted advertising based on utilizing the transaction information and individual permissions, and rating individuals/data based on the quality and reliability of transaction information, according to one embodiment.

FIG. 5 is a flow chart illustrating the process of intelligently compiling transaction information, categorizing the transaction information, providing targeted advertising based on utilizing the categorized transaction information and individual permissions, and rating individuals/data based on the quality and reliability of transaction information. The process of FIG. 5 begins at initiator block 502 and proceeds to block 504, at which Transaction Data Management (TDM) utility 110 receives transaction/activity data report corresponding to a particular individual/member from external application 137. In one embodiment, TDM utility 110 receives external and/or internal transaction reports corresponding to the individual that has a member account on a community networking application. At block 506, TDM utility 110 sends notification to the individual/member of receipt of the transaction/activity data report. At block 508, TDM utility 110 categorizes information outlined in the transaction report.

In one embodiment, a single transaction may be assigned to multiple categories. TDM utility 110 may subsequently value transaction information according to a level of granularity associated with the transaction information.

At block 510, TDM utility 110 receives from the individual/member context information pertaining to transaction/activity corresponding to the transaction/activity data report. In one embodiment, the individual provides context information for transactions based on polls, surveys or other preset questionnaire. For example, the context information may describe a user's motivations for purchasing a particular item and/or the timing of the purchase. In one embodiment, TDM utility 110 enables the individual to submit user data in the form of supplemental transaction information via structured and/or unstructured data inputs. In one embodiment, TDM utility 110 allows an individual/user to submit contextual data about transaction information via an information model, for example, the Reference Information Model (RefIM).

TDM utility 110 detects the initiation of a procedure by which the individual/member provides a transaction schedule including previous and next purchase information, as shown at block 512. In one embodiment, TDM utility 110 utilizes a preset schedule to send automatic requests to the individual/member for information pertaining to transaction scheduling. In one embodiment, TDM utility 110 receives from the individual/member information about preferences pertaining to next purchase items. For example, TDM utility 110 may receive information from the individual which indicates that the individual has a brand preference for Dell, Hewlett Packard (HP) and International Business Machines (IBM) laptop computers. At block 514, TDM utility 110 receives from the individual/member information about causal transactions/activities (i.e., transactions/activities that are associated with or dependent upon corresponding transactions) pertaining to particular transactions. At block 516, TDM utility 110 receives information about user interests. TDM utility 110 automatically generates further causal data from intelligent analysis of transaction data, activity trends of individuals and recorded user interests, as shown at block 518. At block 520, TDM utility 110 updates categories based on supplemental transaction information, user interests and generated causal data.

At block 522, TDM utility 110 rates users and user data. In one embodiment, user ratings are updated when users participate in transactions or other relevant activities. User data is valued according to user rating. In one embodiment, TDM utility 110 awards points to a member during the sale of valuable data of the member and for sales facilitated by the member. The member may facilitate sales by placing links from advertisement of other transactions which links other members are able to access and make purchases. The member may receive other rewards or special deals from business entities for purchases of particular items.

At block 524 TDM utility 110 enables business entities to initiate targeted advertising to members based on categories generated from classifying/categorizing information provided by transaction reports, based on permissions granted by the members to allow respective members to be served advertisements. In one embodiment, TDM utility 110 enables business entities to pre-select transaction triggers by which a business entity may be informed when specified activities occur. In one embodiment, TDM utility 110 automatically initiates a pre-determined action in response to the execution of the transaction trigger. TDM utility 110 detects the execution of one or more transaction triggers, as shown at block 526. At block 528, TDM utility 110 provides access to relevant target pool based on operating policies and permissions provided by the individual. In one embodiment, TDM utility 110 credits the individuals account with points, credit, reward or compensation according to the level of data access. TDM utility 110 detects an individual's receipt of advertising content, as shown at block 530. In one embodiment, TDM utility 110 alerts the individual that a friendly advertisement (i.e., advertising content which is served because the individual previously authorized use of and/or access to transaction reports and enhanced/supplemental transaction data associated with the individual's activities) is being displayed. TDM utility 110 provides individuals that receive advertising content with advertisement tracking information, as shown at block 532. At block 534, TDM utility 110 detects receipt of another transaction record. At block 536, TDM utility 110 determines whether a scheduled transaction occurs. At block 538, TDM utility 110 updates user ratings based on quality and fulfillment of forecasted transactions based on transaction schedule 218. The process ends at block 540.

Figure 6:
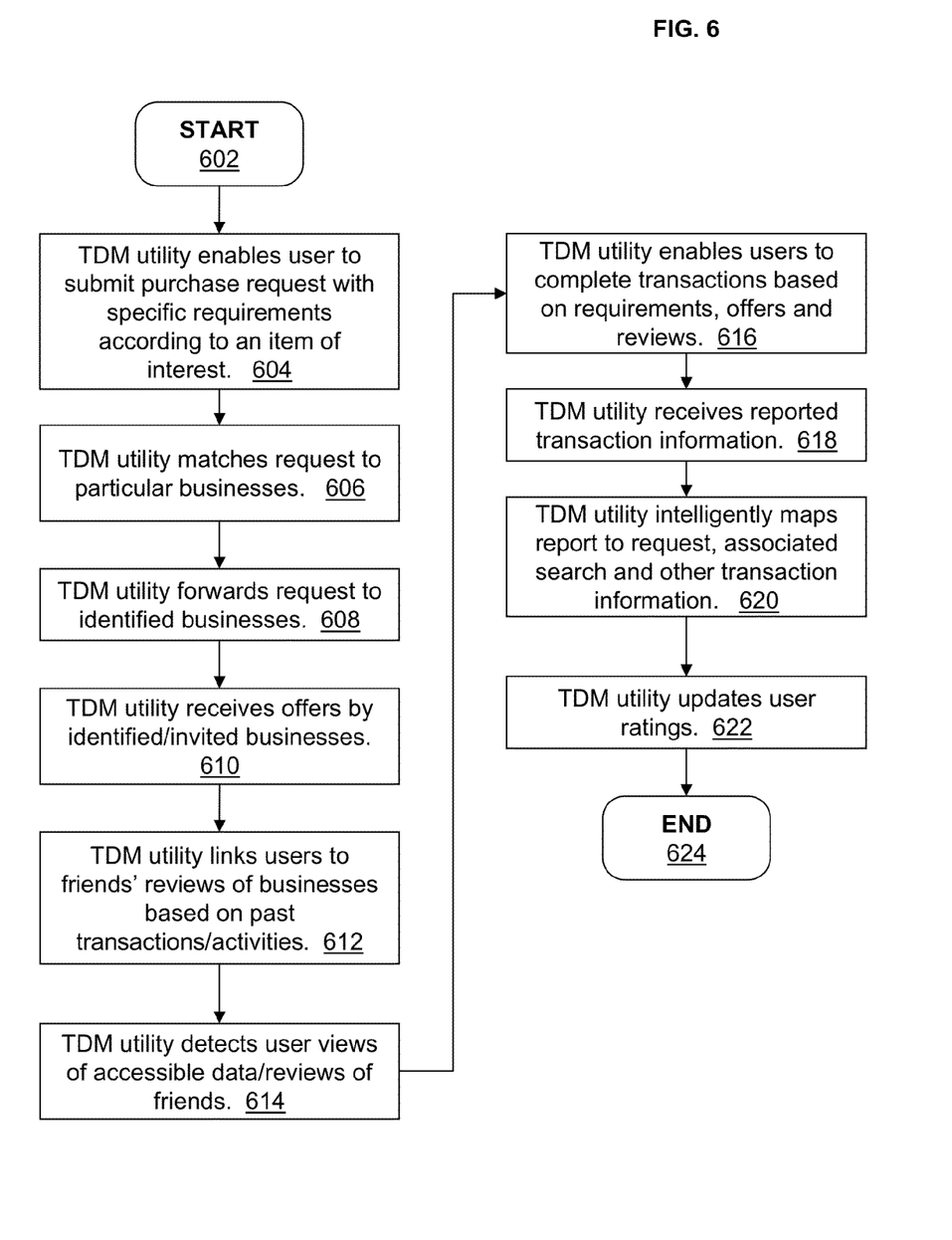
FIG. 6 is a flow chart illustrating the process of enabling buyers and sellers to efficiently engage in transactions by matching buyers' interests and specifications to sellers' items, according to one embodiment, according to one embodiment.

FIG. 6 is a flow chart illustrating the process of enabling buyers and sellers to efficiently engage in transactions by matching buyers' interests and specifications to sellers' items, according to one embodiment. The process of FIG. 6 begins at initiator block 602 and proceeds to block 604, at which Transaction Data Management (TDM) utility 110 enables user 202 to submit a purchase request with specified/custom requirements, according to an item of interest. In one embodiment, TDM utility 110 enables a registered buyer or registered seller to initiate a transaction. The transaction may include one or more of: (a) sale of a first item; (b) purchase of a second item; (c) a transaction between one individual and one or more vendors; (d) a transaction between a group of buyers and one or more sellers/vendors; and (e) other transactions. In one embodiment, the transaction includes one or more of: (a) a group purchase procedure; and (b) a bid procedure. Upon initiation of a particular purchase procedure, TDM utility 110 enables the registered buyer to perform one or more of: (a) identification of a potential group of co-buyers; (b) identification of the purchasing opportunity; (c) identification of a preferred vendor or group of vendors; and (d) transmission of notification and invitation of purchasing opportunity to potential group of co-buyers. TDM utility 110 allows members to initiate group purchases by calculating/generating a group leverage value/report based on consumer value ratings, transaction reports, schedules and/or other activities information (of the relevant members). TDM utility 110 may allow advertisement to groups and/or virtual companies based on group leverage. In one embodiment, TDM utility 110 enables group members to receive discount on purchases based on the group leverage and/or size of the group. Following a group transaction, TDM utility 110 provides appropriate/respective credit/points to (a) the individual and (b) to the group/virtual company. In one embodiment, TDM utility 110 assigns points to a user based on the value of purchases other members make via associated links, level of participation in group activities, involvement in the creation of groups/companies. In one embodiment, TDM utility 110 may provide credits/points to individual members based on a hierarchical rank structure and/or multi-tiered rank structure and/or compensation methodology of a virtual company. Following initiation of a group purchase procedure, TDM utility 110 enables initiation of a simultaneous group payment procedure which enables individual buyers involved in a group purchase transaction to securely provide/make payment or payment arrangement.

At block 606, TDM utility 110 automatically/intelligently matches the request to particular businesses/organizations and subscribers, including firms identified by user. For example, TDM utility 110 may match location-based requests to nearby businesses based upon GPS location of a requesting individual. At block 608, TDM utility 110 forwards request to identified businesses which represents an adequate match for the request. In one embodiment, TDM utility 110 forwards the purchase request to one or more of: (a) one or more matching vendors via a public announcement; (b) one or more matching vendors via a private message; and (c) public bulletin/messaging board designated for the particular type of transaction/request. TDM utility 110 receives responses/offers by invited/"friendly" organizations, as shown at block 610. At block 612, TDM utility 110 automatically links individual to reviews by friends based on past transactions/activities of the friends with any of invited/"friendly" organizations. At block 614, TDM utility 110 detects member's viewing access to accessible data/reviews of friends. At block 616, TDM utility 110 enables individual to complete transactions based on interest in offer details provided by responding businesses and/or corresponding reviews by friends.

In one embodiment, in response to a purchase offer provided by one or more buyers, TDM utility 110 automatically completes transaction payment when a vendor satisfies the purchase offer conditions/parameters. For example, TDM utility 110 may automatically complete transactions when vendor is able to provide item(s) based on specifications by the buyer and buyer(s) agrees to pay an amount specified by the vendor. In response to a purchase offer provided by one or more buyers, TDM utility 110 enables receipt of a counter offer/bid by the vendor(s) when the vendor(s) is unable to satisfy the purchase offer conditions/parameters. Upon receipt of a response that provides a bid offer from one or more vendors, TDM utility 110 enables buyers to select one of: (a) acceptance of the bid offer from the one or more vendors; and (b) rejection of the bid offer.

At block 618, TDM utility 110 receives reported transaction information. At block 620, TDM utility 110 intelligently maps transaction report to user request, associated search/investigation and/or other user profile information including scheduled purchases. TDM utility 110 updates user ratings, as shown at block 622. The process ends at block 624.

Figure 7:
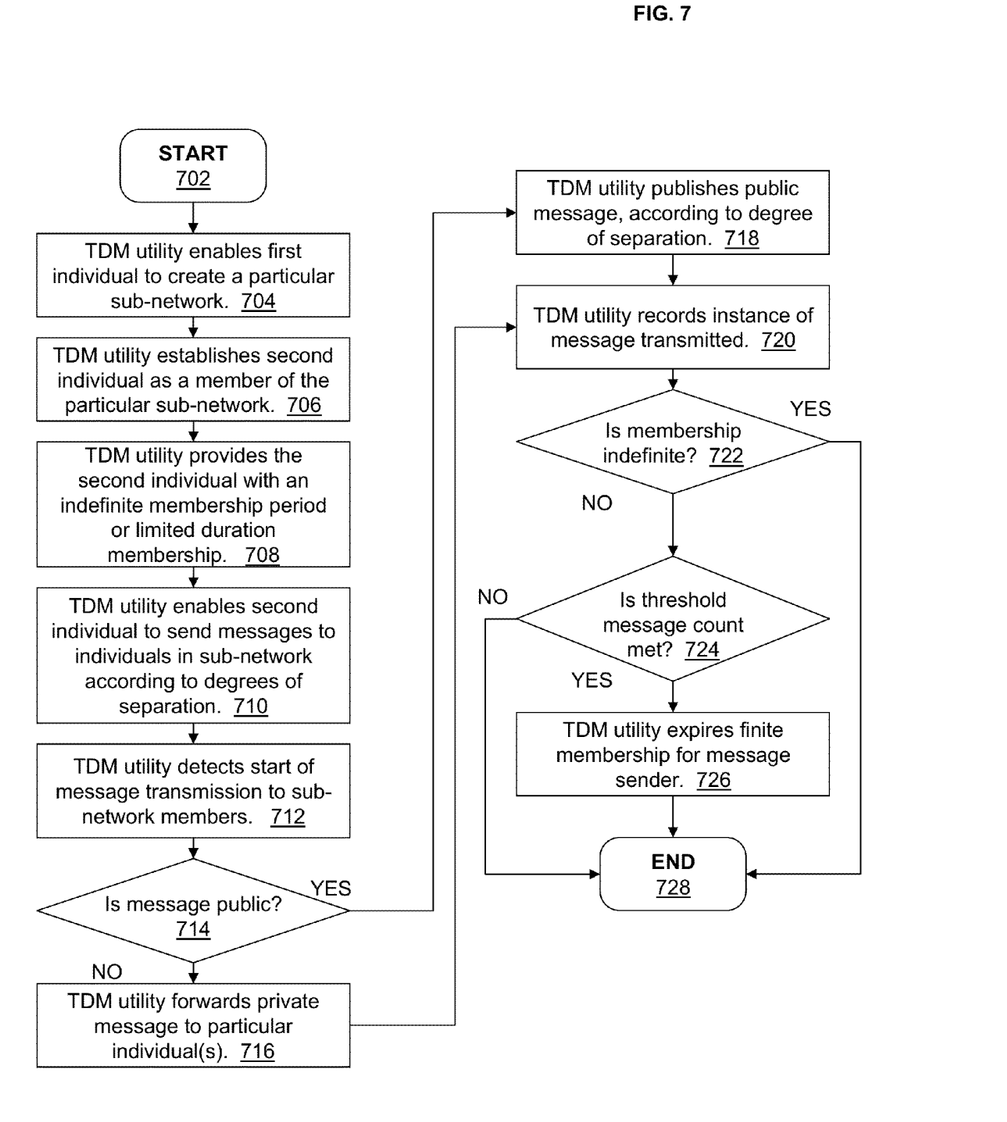
FIG. 7 is a flow chart illustrating the process of enabling an individual or group to create one or more distinct sub-networks, extending various types of sub-network memberships based on characteristics of incoming members and enabling members to communicate according to the privileges of the membership type, according to one embodiment.

FIG. 7 is a flow chart illustrating the process of enabling an individual or group to create one or more distinct sub-networks, extending various types of sub-network memberships based on characteristics of incoming members and enabling members to communicate according to the privileges of the membership type, according to one embodiment. The process of FIG. 7 begins at initiator block 702 and proceeds to block 704, at which Transaction Data Management (TDM) utility 110 enables an individual to create/configure multiple social/community sub-networks for online friendship/affiliation. In one embodiment, TDM utility 110 maps the multiple social/community sub-networks to a single ID corresponding to the individual. The ID may be one of: (a) a personal ID; (b) a business ID. For example, the individual may create two social sub-networks which allow the individual to pursue online friendships and/or accept requests for online friendship via either (a) a first network for his academic associates or (b) a second network for friends closely affiliated with his career. TDM utility 110 enables the individual to provide separation between these two sub-networks, which separation may include preventing messages communicated within one community to be detected within the other community. Thus, each community operates as distinct worlds and represents the social dimensions of the individual. TDM utility 110 effectively enables the individual to separate business from pleasure.

At block 706, TDM utility 110 enables a second individual to be established as a member of a particular sub-network. In one embodiment, TDM utility 110 establishes membership of the second individual based on one or more of: (a) acceptance of an invitation issued by the individual; (b) acceptance of a request made by the second individual, which may be an automatic friend request triggered based on common participation in a selected activity on an internal or external platform; and (c) matching characteristics. At block 708, TDM utility 110 provides the second individual with an indefinite membership period or limited duration membership. At block 710, TDM utility 110 configures a community network application/engine to enable the second individual to send messages to other individuals within the sub-network, according to one or more of: (a) pre-configured degrees of separation; and (b) permissions of individual members. TDM utility 110 detects start of message transmission by the second individual to sub-network members, as shown at block 712. In one embodiment, TDM utility 110 enables messages including advertisements to be sent to sub-network members. At decision block 714, TDM utility 110 determines whether the second individual is initiating a public communication to network members or a private message(s) to selected individuals. If at block 714 TDM utility 110 determines that the second individual is initiating public communication, TDM utility 110 publishes the public message, according to degrees of separation, as shown at block 718. If at block 714 TDM utility 110 determines that the second individual is not initiating a public communication, TDM utility 110 forwards the private message(s) to the selected individual(s), as shown at block 716. In one embodiment, TDM utility 110 automatically determines that if a message is not a public message, the message is, by default, a private message.

At block 720, TDM utility 110 utility records instance of the message transmission/communication. At decision block 722, TDM utility 110 determines whether the membership access is indefinite. If at block 722, TDM utility 110 determines that the membership access is unlimited/indefinite, the process proceeds to block 728. If at block 722, TDM utility 110 determines that the membership access is limited (i.e., not indefinite), the process proceeds to decision block 724 at which TDM utility 110 determines whether the threshold count for authorized message communication is met. If at block 724, TDM utility 110 determines that the threshold count for authorized message communication is met, TDM utility 110 suspends the finite membership/subscription and/or message communication privileges of the corresponding member, as shown at block 726. If at block 724, TDM utility 110 determines that the threshold count for authorized message communication is not met, the process proceeds to block 728 at which block the process ends.

Figure 8:
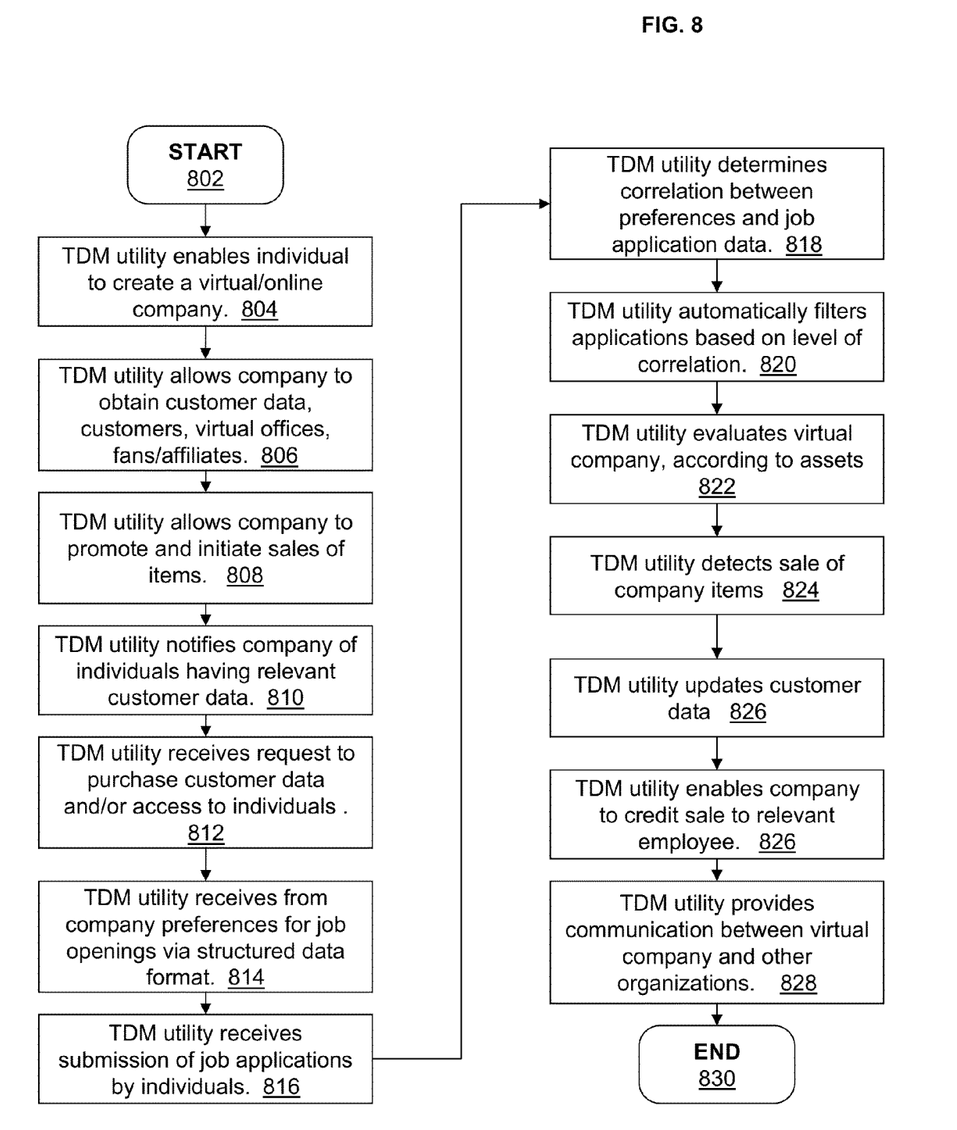
FIG. 8 is a flow chart illustrating the process of enabling individuals or groups to create online/virtual companies to promote/sell items, to selectively/strategically acquire employees and customers based on particular experience, individual interests and transaction information, according to one embodiment.

FIG. 8 is a flow chart illustrating the process of enabling individuals to create online/virtual companies to promote/sell items, to selectively/strategically acquire employees and customers based on particular experience, individual interests and transaction information, according to one embodiment. The process of FIG. 8 begins at initiator block 802 and proceeds to block 804, at which TDM utility 110 enables one or more individuals to create a virtual/online company. In one embodiment, TDM utility 110 enables the online/virtual company to be created via a community networking application. At block 806, TDM utility 110 enables said virtual company to acquire one or more of: online customers, (targeted) customer data, (recording) exclusive or non-exclusive sales/distribution agreements, real and/or virtual companies, intellectual property, virtual offices, personnel, and other assets. At block 808, TDM utility 110 allows the online/virtual company to promote and initiate sales/purchase of items. At block 810, TDM utility 110 automatically notifies the online/virtual company of a pool of potential new customers based on current/updated data of individuals. At block 812, TDM utility 110 receives from the online company a request for the purchase of one or more of: (a) access to user data; and (b) communication access to the corresponding user. At block 814, TDM utility 110 receives from the online company information about preferences pertaining to job openings and job applicants via structured and/or unstructured data.

At block 816, TDM utility 110 detects submission of job applications by individuals to said virtual companies via one or more of: (a) structured data; and (b) unstructured data. At block 818, TDM utility 110 automatically determines a level of correlation between preferences information and data submitted by job applicants. At block 820, TDM utility 110 automatically filters job applicants/applications based on the level of correlation between preferences information and data submitted by job applicants. At block 822, TDM utility 110 evaluates the virtual company, according to assets which for example, include customers, employees and companies owned by the online company, based on consumers' reliability rating/value. In one embodiment, TDM utility 110 rates the company's assets including customers, employees and companies owned by the online/virtual company. At block 824, TDM utility 110 detects sale of products by the virtual company (by an employee/member) to customers/individuals which may involve use of compensation/rewards/redeemable points. At block 826, TDM utility 110 automatically updates consumer/customers/fan data/database. At block 828, TDM utility 110 enables the company to credit a sale to a relevant employee (who may have triggered the sale) via an employee online account. At block 830, TDM utility 110 provides communication between said virtual company and one or more of: (a) a second virtual company; (b) a real company; (c) an external company; and (d) other internal companies. TDM utility 110 may provide communication between companies to configure mergers for particular purchases and/or initiate other transactions. The process ends at block 832.

The illustrated and described embodiments provide, in a data processing system, a method, a system and a computer program product that provides an individual with management/distribution control of the individual's personal information and transaction information. A transaction data management (TDM) utility executes on a data processing system and receives transaction reports from internal/external applications based on member permissions. Based on user configuration/request, the TDM utility records/displays the transaction information as a public announcement or a private log. The TDM utility enables the individual to provide supplemental information describing transactions for which reports are received. In addition, the TDM utility enables the individual to provide a schedule of previous/future transactions. The TDM utility rates the individual according to the quality of transactions and the reliability of the transaction schedule. The TDM utility categorizes activities outlined in the transaction reports/schedules. The TDM utility serves targeted advertisements to the individual and/or performs transactions involving the individual's information, based on permissions and compensation agreements.

In the flow charts above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or logic. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional wireless communication system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible/storage) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system, a method comprising:
enabling a user to provide a schedule of forecasted transactions via a transaction schedule;
receiving, according to request and permissions by a user, transaction reports that indicate activities and transactions conducted by the user from one or more of: (a) internal applications on a same platform of said data processing system; and (b) external applications;
forwarding information from said transaction reports to one or more social media applications;
storing transaction reports in association with a member account of said user;
a processor determining, using received transaction reports, (a) a financial amount of forecasted transactions that are fulfilled and (b) the reliability of the transaction schedule based on how closely forecasted information from the transaction schedule matches the information from the received transaction reports;
determining a consumer value rating of the user using (a) the financial amount of forecasted transactions that are fulfilled and (b) the reliability of the transaction schedule; and
serving targeted advertisements to the user as a result of (a) the consumer value rating of the user and (b) an indication from the received transaction reports of types of items purchased.

2. The method of claim 1, further comprising:
categorizing activities outlined in the transaction reports/schedules;
enabling the user to select a subset of the information from said transaction reports to be displayed to contacts/friends in the social media application;
displaying the subset of information from said transaction reports to contacts/friends in the social media application; and
enabling the user to provide supplemental information about transactions reported via the member account.

3. The method of claim 1, further comprising:
enabling the user to create online, virtual companies and groups comprising other members;
allowing the user to establish separate networks for friends and affiliates with different interests and experiences;
allowing individuals to collaborate with other members to perform group transaction; and
receiving payment for group transactions by initiating a simultaneous group payment procedure.

4. The method of claim 1, further comprising:
determining whether the report provides information that matches an activity/transaction forecasted/indicated on the transaction schedule of forecasted transaction information;
providing the user rating in response to the report providing information that matches an activity/transaction forecasted/indicated on the transaction schedule; and
rating the user according to how closely the forecasted information from the transaction schedule matches the information from the transaction report.

5. The method of claim 1, further comprising:
when one or more members of a group of members that are involved in a transaction via an internal or external platform are involved in a same transaction, triggering a friend request between the members who do not have an online friendship on the social networking website.

6. The method of claim 1, further comprising:
enabling the user to control advertisements to the user, wherein the advertisements are based on: (a) information from the transaction reports; and (b) the consumer value/rating; and
enabling the user to make compensation agreements associated with the targeted advertisements served to the user based on one or more of:
(a) the consumer value rating; and
(b) the transaction schedule.

7. The method of claim 1, further comprising:
providing an alert to the user when a friendly or authorized advertisement is being received by the user; and providing the user with tracking information which indicates one or more of:
- (a) transaction information of other members to indicate that other members execute transactions via links that are placed on member pages based on previous activities by the user;
- (b) information associated with an authorized access granted to vendors to user and consumer controlled data; and
- (b) received advertisements.

8. The method of claim 1, further comprising:

in response to initiation of group purchases, generating at least one of a group leverage value and a report based on one or more of: (a) information from the transaction reports; (b) supplemental information; and (c) consumer reliability value/rating;

negotiating discounts based on group leverage;

sending advertisements to groups and virtual companies based on group leverage;

following a group transaction, providing appropriate credit to (a) respective individuals within the group; and (b) the group or virtual company; and assigning points to a user based on one or more of:
- (a) a value of purchases other members make via links associated with the user;
- (b) a level of participation in group activities; and
- (c) a level of involvement in a creation of groups/companies.

9. A computer program product comprising a non-transitory computer readable device and program code on the computer readable device that when executed by a processor of a computer device performs the functions of:

enabling a user to provide a schedule of forecasted transactions via a transaction schedule;

receiving, according to request and permissions by a user, transaction reports that indicate activities and transactions conducted by the user from one or more of: (a) internal applications on a same platform of said data processing system; and (b) external applications;

forwarding information from said transaction reports to one or more social media applications;

storing transaction reports in association with a member account of said user;

a processor determining, using received transaction reports, (a) a financial amount of forecasted transactions that are fulfilled and (b) the reliability of the transaction schedule based on how closely forecasted information from the transaction schedule matches the information from the received transaction reports;

determining a consumer value rating of the user using (a) the financial amount of forecasted transactions that are fulfilled and (b) the reliability of the transaction schedule; and serving targeted advertisements to the user as a result of (a) the consumer value rating of the user and (b) an indication from the received transaction reports of types of items purchased.

10. An electronic device comprising a processor and program code executing on the processor that enables the device to:

enable a user to provide a schedule of forecasted transactions via a transaction schedule;

receive, according to request and permissions by a user, transaction reports that indicate activities and transactions conducted by the user from one or more of: (a) internal applications on a same platform of said data processing system; and (b) external applications;

forward information from said transaction reports to one or more social media applications;

store transaction reports in association with a member account of said user;

determine, using received transaction reports, (a) a financial amount of forecasted transactions that are fulfilled and (b) the reliability of the transaction schedule based on how closely forecasted information from the transaction schedule matches the information from the received transaction reports;

determine a consumer value rating of the user using (a) the financial amount of forecasted transactions that are fulfilled and (b) the reliability of the transaction schedule; and serve targeted advertisements to the user as a result of (a) the consumer value rating of the user and (b) an indication from the received transaction reports of types of items purchased.

* * * * *